Figure 1:
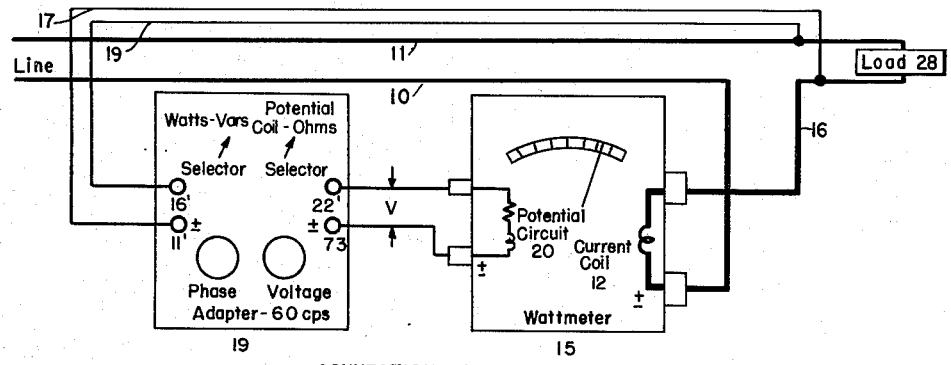

Aug. 15, 1961  C. FAHRNER  2,996,671

WATT METER SYSTEM

Filed Aug. 18, 1958

CONNECTION DIAGRAM

WATTMETER-VAR ADAPTER WIRING DIAGRAM

United States Patent Office 2,996,671
Patented Aug. 15, 1961

2,996,671
WATT METER SYSTEM
Charles Fahrner, 1933 S. Ashland Ave., Park Ridge, Ill.
Filed Aug. 18, 1958, Ser. No. 755,765
5 Claims. (Cl. 324—141)

This invention relates to a wattmeter system and more particularly to a system for determining the reactive volt-amperes flowing through a load. The system is useful in that it embodies a conventional wattmeter and permits a quick determination of the actual electric power flowing through a load and the so-called wattless power flowing through a load.

A system embodying the present invention has numerous applications, but is particularly useful in connection with the testing of alternating current apparatus and loads with a view to determining resistance, reactance and impedance thereof. A simple and effective method of making such a determination involves the measurement of the electric power drawn by a load at its rated frequency and also the reactive volt-amperes drawn by such load at its rated voltage and frequency.

Once these factors are known, the determination of the impedance or the reactance, or both, together with the angle of lag or lead of voltage with respect to current, becomes a simple problem in geometry. Thus, if a conventional right triangle is assumed, one of the sides may be represented or will represent the real power drawn by a load as measured by a conventional wattmeter. The other side of the triangle will represent the reactive volt-amperes. The hypotenuse will represent the total volt-amperes of the load. The angle between the hypotenuse and the first side of the triangle will be the angle of lag or lead of voltage with respect to current.

As is well known, a wattmeter utilizes the interaction between the magnetic fields due to a current coil and a voltage coil for determining the watts of power being measured. The integrating type of wattmeter, usually designated as a watt-hour-meter simply consists of an electric motor with two windings, one being the current winding and the other being the voltage winding. In all such types of devices, the instantaneous voltage and current determines the instantaneous force existing between the two magnetic fields. Such instantaneous force when measured against some standardized force, such as a spring in the case of a wattmeter or some load such as in a watt-hour-meter, will show the real power or watts passing through the instrument.

A conventional wattmeter or watt-hour-meter may be arranged to measure reactive volt-amperes. This may be accomplished by having a capacitor in series with the potential circuit and an inductor shunting the potential circuit. Such an arrangement, however, in practice is performed at the factory where the instrument is being manufactured and where suitable tests may be made.

This invention provides an adapter and makes it possible to use any conventional wattmeter or watt-hour-meter for determining either the real watts taken by a load, this being accomplished by the wattmeter itself, and without any change of the instrument, or to determine the reactive volt-amperes in the system. Thus, the invention makes possible the testing of alternating current apparatus with conventional wattmeters, such testing being within the limit of accuracy of the meter.

This invention is based upon the fact that certain types of filters can have the property of providing a 90° phase shift, regardless of source or load impedance providing the frequency operated upon by the filter remains constant. Since the power frequency, usually 60 cycles, is carefully maintained at a constant value, and since the sine wave of the potential supplied by the power lines is carefully maintained, a highly accurate phase shift is possible.

In accordance with the present invention, I have found that providing a high pass constant K type of filter between the power line and the potential winding of a wattmeter makes it possible to obtain reactive volt-ampere measurements from a conventional wattmeter. The above is true whether the meter is of the simple type measuring instantaneous watts or of the integrating type measuring power over an interval of time.

The invention in general contemplates the use of a high-pass constant K type filter wherein the cutoff frequency is 70.7% (one-half of the square root of 2) of the power frequency being supplied to the load. For most purposes, at least in the United States, such a frequency will either be 60 cycles or 25 cycles. However, the invention may be adapted for any desired power frequency by proper design. For 60 cycle work, the cutoff frequency will be substantially 42 cycles per second. Frequencies higher than 42 will be passed.

The operation of the invention is based upon the fact that a high pass filter having the cutoff frequency, as hereinbefore set forth, will have a 90° phase shift and will maintain this phase shift independently of the Q or dissipation of the filter elements (the dissipation of the capacitor is assumed to be negligible) as well as being independent of source and terminating impedance.

The filter system also becomes a constant current device if dissipation is omitted. The 90° phase shift, however, is maintained even when dissipation is present under all load conditions assuming that the frequency is constant.

In order that the invention may be understood, it will now be disclosed in connection with drawings wherein FIGURE 1 is a diagrammatic representation of a system embodying the present invention with the filter network being shown in block form. The plus and minus signs are used for polarity identification.

Figure 2:
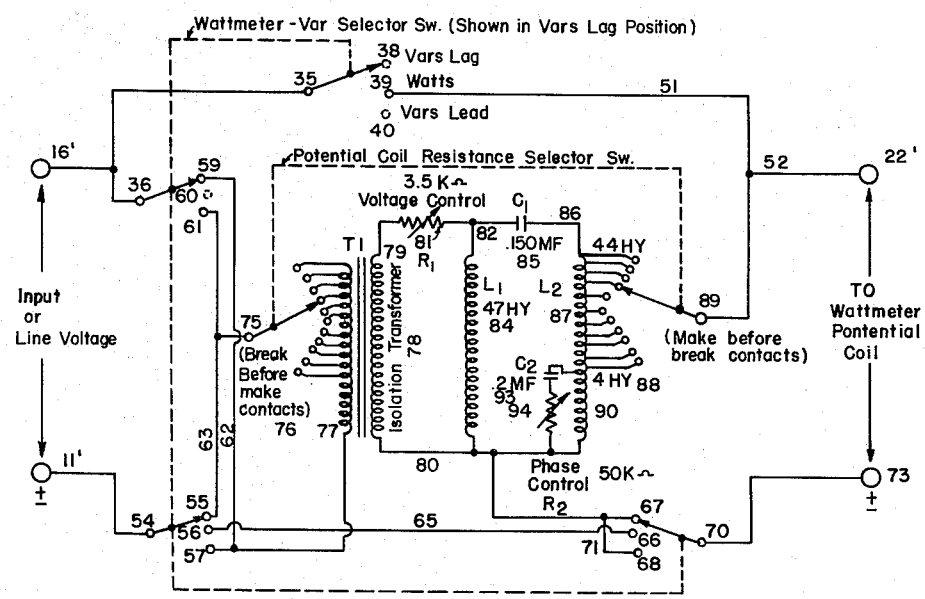

FIGURE 2 shows a filter network which is used in a system embodying the invention, the filter network being designed especially for use with 60 cycles.

Referring first to FIGURE 1, 10 and 11 are the lines of the system to be connected to an alternating current power source. Line 10 is connected through current coil 12 forming part of a wattmeter generally indicated by 15. Wattmeter 15 may be of any type having current and potential coils. The other terminal of current coil 12 is connected to junction 16. From junction 16 and line 11 run wires 17 and 18 to input terminals 16' and 11' of adapter 19. The adapter output terminals are connected to potential circuit 20. The load 28 whose RVA characteristic is to be determined is connected across junction 16 and line 11.

Referring now to FIGURE 2, a phase shifting network is illustrated together with switching means for use with the potential coil of a wattmeter, the system illustrated in FIGURE 2 being designed especially for 60 cycles per second. The system illustrated in FIGURE 2 is adapter 19 of FIGURE 1.

Terminal 16' in FIGURE 2 is connected to movable contacts 35 and 36 of a multisection switch. Movable contact 35 cooperates with three contacts 38, 39 and 40 of which only 39 is a live contact. Contact 39 is connected by wire 51 to junction point 52. Junction point 52 is connected by wire to output terminal 22'.

Input terminal 11' is connected to movable contact 54 cooperating with three fixed contacts 55, 56 and 57. Movable contact 36 cooperates with fixed contacts 59, 60 and 61 of which center contact 60 is dead. Fixed contact 59 is connected by jumper 62 to contact 57. Fixed contact 61 is connected by jumper 63 to fixed contact 55.

Contact 56 is connected by jumper 65 to contact 66 of a group of three contacts 66, 67 and 68 cooperating with movable contact 70. Contacts 67 and 68 are connected by jumper 71. Movable contact 70 is connected to output terminal 73.

Jumper 63 is connected to movable contact 75 which plays over bank 76 of contacts connected to various portions of primary winding 77 of isolation transformer 78. The taps on the primary permit an impedance transformation in suitable steps such as about 20% as an example. Transformer 78 has terminals 79 and 80, respectively. Terminal 79 is connected through variable resistor 81 to junction point 82. Resistor 81 is provided as a sort of vernier control to take care of fine adjustments between the divisions of contacts 76 and 88. Thus for any setting of movable contacts 75 and 87, resistor 81 can provide added adjustment to the contact banks 76 and 88.

Junction points 80 and 82 form the input terminals of the filter section. Between junction points 80 and 82 is connected input inductance 84. Capacitor 85 is connected between junction 82 and terminal 86 of output inductance 87. Inductance 87 has taps to bank 88 of contacts with which movable contact 89 cooperates. Movable contact 89 is connected to junction point 52. Inductance 87 has portion 90 thereof which is below the taps. Portion 90 of the inductance has one terminal connected to junction point 80. Across portion 90 of the inductance there is connected in series capacitor 93 and variable resistor 94, which also connects to fixed contact 67. Capacitor 93 and resistor 94 function as a phase control and give the effect of a variation of the inductive reactance output of 87. It is preferred to provide about a 5% variation of reactance above or below theoretical filter value to compensate for meter variations.

The dotted lines connecting the various movable switch contacts indicate the movable contacts that operate simultaneously. The top position, this being the position shown in the drawing, is to be used for lagging current. The bottom position is to be used for leading current. The center position functions to disconnect the entire phase shift system and permits the wattmeter to function in a conventional manner.

In the case of isolation transformer 78, it is desirable to have the tap switch so arranged that a contact is broken before a succeeding contact is made. In the case of inductance 87, the reverse arrangement is preferred, namely, that a break is not accomplished until a succeeding contact has been made. This is due to the constant current characteristic and prevents high potentials being present.

For 60 cycle work variable resistor 81 may have a range of about 3500 ohms. Capacitor 85 is about .150 microfarads. Capacitor 93 has about .2 microfarads. It is necessary to have a good quality capacitor at 85 so that dissipation will be negligible.

The total value of inductance 84 is 47 henries while the Q is about 6. The total value of inductance 87, including portion 90, is 44.5 henries with portion 90 having a value of about 4 henries. For inductance stability, the inductance cores should have air gaps. The isolation transformer however should have low leakage reactance.

The example given above has been designed for 60 cycle operation. It is understood that different values for inductances and capacitors will be necessary for frequencies other than 60 cycles. The high pass constant K type of filter is a full pi section having input and output inductors connected by a capacitor.

Inductance 87 is so designed with regard to the amount and type of iron that it will saturate the iron at overload. Hence dangerous voltages will not be generated if the output circuit happens to be open.

To calibrate the adapter in "Vars" position, (reactive volt-amperes position) load 28 should be pure resistance capable of drawing current to the full rating of the current coil of the wattmeter so that the phase control 94 can be adjusted until the wattmeter deflection is zero. The voltage at "V" FIGURE 1, must remain unchanged when the adapter is switched from "Vars" to "watts," by adjusting the voltage control 81 in FIGURE 2.

Transformer 77 could be of the autotransformer type, except that voltage stresses may be too severe for some instruments when switching from "Vars lead" to "Vars lag."

The filter illustrated is of the pi type and the arrangement of the output reactor provides some flexibility.

What is claimed is:

1. An adapter for use with all dynamometer types of wattmeters for use in RVA measurements at a specified frequency on a load energized from an A.C. power line, said wattmeter having potential and current circuits and normally indicating real power without said adapter and indicating reactive volt-amperes when said adapter is connected between the power line and potential circuit, said adapter having two input terminals for connection across the power line, an isolation transformer having primary and secondary windings, said primary having a plurality of taps, a movable contact for cooperating with said taps, a connection between one adapter input terminal and one terminal of the primary winding, a connection between said other adapter input terminal and said movable contact whereby said line potential may be impressed across a desired part of the entire primary winding, a variable resistor in series with said secondary winding, the free ends of said secondary and variable resistor providing isolation output terminals, a full pi section constant K type high pass filter having its input terminals connected to the isolation output terminals, said filter having a cut-off frequency of ½ the square root of 2 times the power frequency for providing a 90° phase shift at the power frequency, said filter including as a part thereof an output terminating inductor, said inductor having one free terminal connected to one filter output terminal and having a plurality of taps with which a filter output movable contact cooperates to provide another filter output terminal, said output terminals being provided for connection to the potential circuit terminals of a dynamometer type wattmeter, manual means for simultaneously operating said two movable contacts, said movable contacts in one direction of movement increasing the line potential on the isolation transformer primary and increasing the terminating inductor potential available at the filter output terminals and in the other direction of movement decreasing the potentials.

2. The system according to claim 1 wherein an additional phase shift means is provided at the filter terminating inductor, said additional phase shift means having a range small in comparison to the 90° shift of the filter section whereby the total phase shift at the filter output is 90° plus or minus a small range for compensating for variations of phase characteristics among different wattmeters.

3. The system according to claim 2 wherein said addition phase shift means is an R-C network connected across part of the filter terminating inductor.

4. The system according to claim 1 wherein the movable contact for the isolation transformer primary opens the circuit for a tap before completing the circuit with an adjacent tap and wherein the movable contact for the filter terminating inductor closes the circuit for an adjacent tap before breaking from a tap.

5. The system according to claim 1 wherein an additional phase shift means of the R-C type is provided across part of the filter terminating inductor to provide an additional phase shift small in comparison to the 90° filter section phase shift whereby the total phase shift at the filter output is 90° plus or minus a small range for compensating for variation of phase characteristics among different wattmeters, means providing for breaking the circuit before make when moving the isolation transformer primary movable contact and for making before breaking when moving the movable contact for the filter terminating inductor and three position switch means for connecting the power line to the isolation transformer primary for one polarity for lagging load current in one switch position, reversing the power line for leading load current in another switch position and for cutting out the adapter and connecting the power line to the filter output terminals for connection to the potential circuit of a wattmeter in still another switch position.

References Cited in the file of this patent
UNITED STATES PATENTS

| | | |
|---|---|---|
| 1,990,964 | Varley | Feb. 12, 1935 |
| 2,059,738 | McCurdy | Nov. 3, 1936 |
| 2,185,038 | Rowell | Dec. 26, 1939 |
| 2,300,958 | Oman | Nov. 3, 1942 |

FOREIGN PATENTS

| | | |
|---|---|---|
| 589,857 | France | June 6, 1925 |